Dec. 20, 1960  H. A. JACKSON  2,965,303
COOLANT INJECTION IN A FUEL NOZZLE
Filed March 30, 1959

INVENTOR
HENRY A. JACKSON
BY Charles A. Warren
ATTORNEY

United States Patent Office 2,965,303
Patented Dec. 20, 1960

2,965,303

COOLANT INJECTION IN A FUEL NOZZLE

Henry A. Jackson, Glastonbury, Conn., assignor to United Aircraft Corporation, East Hartford, Conn., a corporation of Delaware Filed Mar. 30, 1959, Ser. No. 802,986

6 Claims. (Cl. 239—132)

This invention relates to fuel nozzles particularly adapted for use in gas turbine engines and more specifically to an arrangement for adding a coolant to the fuel entering the combustion chamber.

One feature of the invention is an arrangement for delivering coolant to the annular space surrounding the tip of the fuel nozzle such that the coolant enters the combustion chamber at a point adjacent to the delivery of fuel to the chamber. Another feature is an arrangement for mixing a coolant with air flowing into the combustion chamber such that the mixture of air and coolant enters the combustion chamber adjacent to the fuel discharge.

Other features and advantages will be apparent from the specification and claims, and from the accompanying drawings which illustrate an embodiment of the invention.

Figure 1:
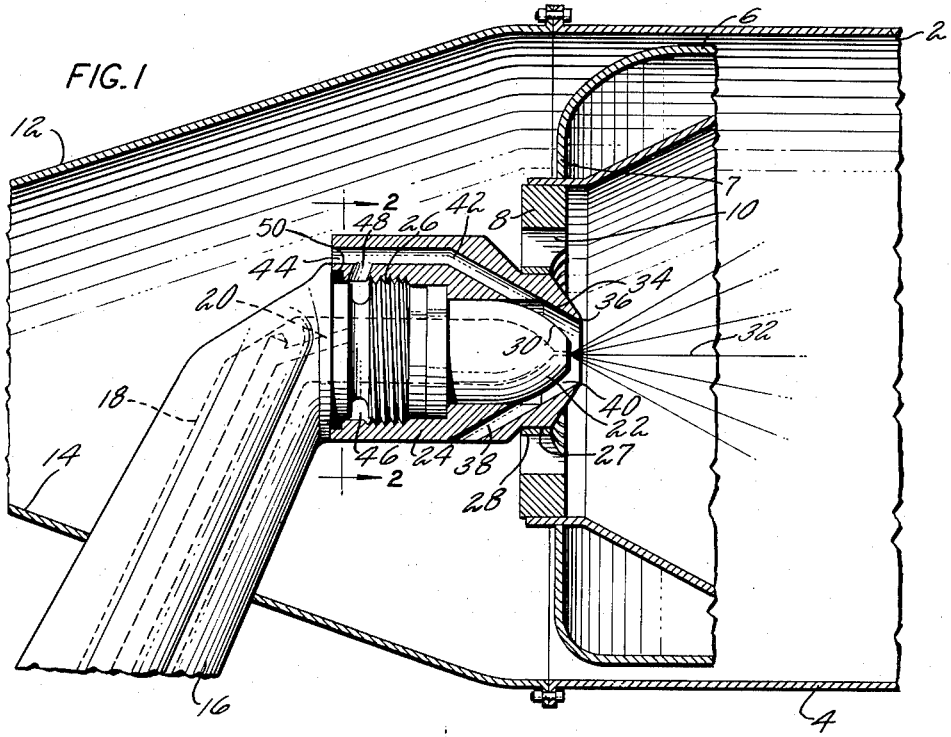
Fig. 1 is a longitudinal sectional view through a nozzle construction, a portion of which is substantially along line 1—1 of Fig. 2.

The arrangement is shown in connection with the main combustion chamber of a gas turbine engine, the chamber being defined by an outer wall 2 and an inner wall 4. Between these walls is the annular flame tube 6 the upper end 7 of which is partially closed and supports a ring 8 having swirl vanes 10 such that air passing over these vanes is given a swirling motion as it enters the flame tube. The flame tube is supported within the combustion chamber by any well-known means not shown. Upstream of the combustion chamber is the diffuser section defined by an outer wall 12 and an inner wall 14. The outer wall 12 is connected at its downstream end to the combustion chamber wall 2 and the inner wall 14 is connected to the inner wall 4 of the combustion chamber. It will be understood that air flows through the diffuser and into the combustion chamber in a generally axial direction, a portion of the air entering the flame tube past the swirl vanes 10.

The diffuser supports a fuel supply arm 16 having a passage 18 therein for fuel and another passage 20 for coolant. On the end of this arm is mounted the fuel nozzle 22 around which is positioned a ring 24 the latter being preferably held thereon as by threads 26. Adjacent its downstream end the ring 24 has a cylindrical surface 27 fitting within a ring 28 on the inner ends of the swirl vanes 10 such that the nozzle and flame tube are held in concentric relation to each other.

Figure 2:
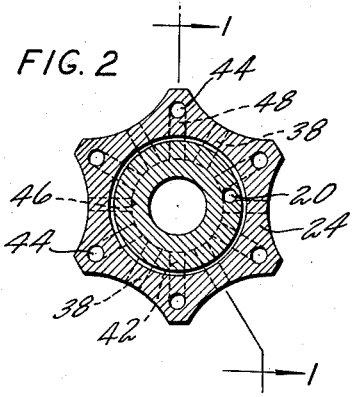
Fig. 2 is a transverse sectional view substantially on the line 2—2 of Fig. 1.

The nozzle 22 has a tapering tip 30 adjacent its downstream end and the fuel is discharged in a spray 32 from an opening centrally of the tip 30. Around the tip and in spaced relation thereto is a conical surface 34 on the ring 24 terminating in an opening 36 concentric to the tip 30 and slightly downstream of the tip. The ring 24 has a plurality of obliquely positioned passages 38 which extend from the outer surface of the ring to communicate with the space 40 between the nozzle tip 22 and the conical surface 34. Angularly spaced from and positioned between the passages 38 are other passages 42 which extend obliquely in a manner similar to the passages 38 at their downstream ends but which have axially extending upstream portions 44 terminating in the upstream ends of the ring 24. It will be apparent that the ring 24 may be scallop-shaped on its outer surface as shown in Fig. 2 to accommodate the passages 44 and still require a minimum of weight.

The nozzle has an annular groove 46 adjacent its connection with the arm 16 and this annular groove communicates with the coolant passage 20. The portion of the ring 24 surrounding the nozzle adjacent to the groove 46 has obliquely positioned passages 48 providing a flow path for coolant from groove 46 into the passages 44. A seal 50 may close the space between the arm 16 and the ring 24, as shown.

In operation, fuel is supplied through the passage 18 and discharges through the nozzle tip, as shown. Air flowing through the diffuser around the nozzle enters the passages 44 and is discharged into the space 40 flowing over the tip 30 of the nozzle and out the opening 36. Other air entering the oblique passages 38 is also discharged into the space 40 surrounding the nozzle tip and discharges through the opening 36 around the fuel spray. When coolant is to be supplied this coolant is delivered through the passage 20 into the groove 46. The coolant is aspirated through the passages 48 into the passages 44 by the flow of air through passages 44 and mixes with the air so that it is discharged over the nozzle tip and thence out the opening 36 in the form of an annulus surrounding the fuel spray. With this arrangement, the function of the air in cooling the nozzle tip is not affected by the flow of coolant.

It is to be understood that the invention is not limited to the specific embodiment herein illustrated and described, but may be used in other ways without departure from its spirit as defined by the following claims.

I claim:

1. A fuel nozzle for positioning in an air stream, said nozzle having a tapering tip with a fuel discharge opening therein, said nozzle being positioned in an opening in a flame tube, in combination with a ring surrounding said nozzle and having a conical inner wall surrounding and spaced from said tip, said ring having a plurality of generally axial passages therein, said passages being open at their upstream ends for the admission of air from said stream, said passages communicating with the space around said tip, and means within the nozzle and connected to said passages between the ends thereof for supplying a coolant to said passages to mix with the air therein.

2. A fuel nozzle for positioning in an air stream, said nozzle having a tapering tip with a fuel discharge opening therein, said nozzle being adapted to be positioned in an opening in a flame tube, in combination with a ring surrounding said nozzle and having a substantially conical inner wall surrounding and spaced from said tip to form a space, said ring having a plurality of generally axial passages therein, said passages being open at their upstream ends for the admission of air from said stream, said passages communicating with the space around said tip, said nozzle and ring being formed to provide an annular groove therebetween at a point spaced from said tip, said ring having lateral passages therein between said groove and said generally axial passages, and means communicating with said groove for supplying coolant to said groove, said lateral passages providing for the flow of coolant from said groove to said axial passages.

3. A fuel nozzle mounted on a fuel supply arm and having a tapering tip through the end of which fuel is discharged, said nozzle being positioned in a passage adapted for the flow of air therethrough in a direction substantially parallel to the fuel nozzle, in combination with a ring attached to and surrounding said nozzle and having a substantially conical inner wall therein surrounding and spaced from said tip to define a coolant chamber, said ring having generally axial passages therein communicating with said chamber at their downstream end and open to the air passage at their upstream end, means within the nozzle and connecting with said passages between the ends thereof for supplying a coolant to said passages to mix with the air therein, and a passage in said supply arm and connecting with said means for supplying the coolant to said air passages.

4. A fuel nozzle mounted on a fuel supply arm and having a tapering tip through the end of which fuel is discharged, said nozzle being positioned in a passage adapted for the flow of air therethrough in a direction substantially parallel to the fuel nozzle, in combination with a ring mounted on and surrounding said nozzle and having a conical inner wall therein surrounding and spaced from said tip to define a coolant chamber, said ring having generally axial passages therein communicating with said chamber at their downstream end and open to the air passage at their upstream end, said nozzle and ring having an annular groove therebetween at a point spaced from said tip, and means for delivering a coolant to said groove, said ring having passages therein from said groove to said generally axial passages for the flow of coolant from said groove into the axial passages.

5. A nozzle as in claim 4 in which the means for delivering coolant includes a coolant passage in the supply arm.

6. A nozzle as in claim 4 in which the passages from the groove extend obliquely in a downstream direction toward the generally axial passages.

References Cited in the file of this patent
UNITED STATES PATENTS

| | | |
|---|---|---|
| 2,019,815 | Holtham | Nov. 5, 1935 |
| 2,103,958 | Stillman | Dec. 28, 1937 |
| 2,483,951 | Watson | Oct. 4, 1949 |
| 2,893,647 | Wortman | July 7, 1959 |

FOREIGN PATENTS

| | | |
|---|---|---|
| 645,908 | Great Britain | Nov. 8, 1950 |